(12) United States Patent
Aruga et al.

(10) Patent No.: US 6,220,986 B1
(45) Date of Patent: Apr. 24, 2001

(54) VEHICLE CONTROL SYSTEM FOR SUPPRESSING SHIFT DETERMINATIONS AT A CORNER USING ROAD DATA

(75) Inventors: Hideki Aruga, Anjo; Kunihiro Iwatsuki; Takashi Ota, both of Toyota; Toshihiro Shiimado, Tokyo, all of (JP)

(73) Assignees: Aisin AW Co., Ltd., Anjo; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/126,754

(22) Filed: Jul. 31, 1998

(30) Foreign Application Priority Data

Aug. 1, 1997 (JP) .................................... 9-207869

(51) Int. Cl.[7] ................................................ F16H 61/00
(52) U.S. Cl. .................................. 477/97; 701/53; 701/65
(58) Field of Search ........................... 477/110, 97, 107, 477/109; 701/65, 53

(56) References Cited

U.S. PATENT DOCUMENTS

| | | | |
|---|---|---|---|
| 4,966,049 | * 10/1990 | Takahashi | 701/65 X |
| 5,598,335 | * 1/1997 | You | 701/65 |
| 5,748,472 | * 5/1998 | Gruhle et al. | 701/65 X |
| 5,864,771 | * 1/1999 | Yokoyama et al. | 701/208 |
| 5,890,087 | * 3/1999 | Ryoo | 701/65 X |
| 5,893,894 | * 6/1999 | Moroto et al. | 701/53 |
| 5,911,771 | * 6/1999 | Reichart et al. | 477/97 X |

FOREIGN PATENT DOCUMENTS

| | | | |
|---|---|---|---|
| 359140953 | * 8/1984 | (JP) | . |
| 60-142095 | * 6/1985 | (JP) | . |
| 361262259 | * 11/1986 | (JP) | . |
| 4-015799 | 1/1992 | (JP) | . |
| 5-262251 | 10/1993 | (JP) | . |
| 6-74321 | * 3/1994 | (JP) | . |
| 6-298420 | * 12/1994 | (JP) | . |
| 7-085392 | 3/1995 | (JP) | . |
| 7-306998 | 11/1995 | (JP) | . |
| 8-072591 | 3/1996 | (JP) | . |
| 409229174 | * 9/1997 | (JP) | . |
| 11-51174 | * 2/1999 | (JP) | . |

\* cited by examiner

Primary Examiner—Khoi Q. Ta
(74) Attorney, Agent, or Firm—Oliff & Berridge, PLC

(57) ABSTRACT

A vehicle control system comprising a vehicle speed sensor for detecting the speed of a vehicle; a recommended gear stage determine device for determining a recommended gear stage of an automatic transmission based on the vehicle speed and road situation; an upper limit gear stage set device for setting an upper limit gear stage on the basis of the recommended gear stage; and a shift device for changing the speed at the upper limit gear stage. The recommended gear stage determine device includes a suppress device for suppressing the number of determinations of the recommended gear stage at a corner.

12 Claims, 9 Drawing Sheets

VEHICLE CONTROL SYSTEM FOR SUPPRESSING SHIFT DETERMINATIONS AT A CORNER USING ROAD DATA

BACKGROUND OF THE INVENTION

1. Field of Invention

The invention relates to a vehicle control system and a recording medium storing programs for the system.

2. Description of Related Art

In an automatic transmission of the related art, a vehicle speed and a throttle opening are detected to select a gear stage corresponding to the vehicle speed and the throttle opening, so that a gear ratio of the transmission is changed to effect an upshift or downshift.

Moreover, the speed change for the downshift is exemplified by the speed change of a kickdown when the driver depresses the accelerator pedal intensely, the speed change of a coast-down when the driver releases the accelerator pedal to lower the vehicle speed, or the speed change which is effected when the driver operates the shift device such as a shift lever or a shift switch.

In the automatic transmission of the related art, however, when the vehicle comes to a corner, the speed change of the downshift is not ordinarily performed. When the vehicles comes out of the corner, the speed change of the downshift is performed by the kickdown.

Therefore, there has been proposed a vehicle control device which is enabled to change the speed by the downshift on the basis of the road situations. In this proposal, an upper limit gear stage is set to keep an upper gear stage than the upper limit one from being selected, when predetermined conditions such as an estimation that the vehicle comes to the corner and a release of the accelerator pedal are satisfied.

When the corner continues, however, the upper limit gear stage is repeatedly set so that the gear stage is frequently changed to degrade the drive feeling.

SUMMARY OF THE INVENTION

The invention has been conceived to solve the above-specified problems of the related art and has an object to provide a vehicle control system which is freed from having a degraded drive feeling when the corner continues, and a recording medium storing programs for the system.

According to the invention, therefore, there is provided a vehicle control system comprising a vehicle speed sensor for detecting the speed of a vehicle; recommended gear stage determine means for determining a recommended gear stage of an automatic transmission matched to the vehicle speed and road situations; upper limit gear stage set means for setting an upper limit gear stage on the basis of the recommended gear stage; and shift means for changing the speed at the upper limit gear stage.

Moreover, the recommended gear stage determine means includes suppress means for suppressing the number of determinations of the recommended gear stage at a corner.

In the vehicle control system of the invention, moreover the recommended gear stage determine means performs a hold control to keep the present gear stage, when the vehicle speed exceeds a first set value, and a shift allowance control to allow a downshift when the vehicle speed exceeds a second set value.

Moreover, in the vehicle control system of the invention, the suppress means suppresses the number of determinations of the recommended gear stage by widening the area of the hold control.

In the vehicle control system of the invention, the suppress means suppresses the number of determinations of the recommended gear stage by widening the area of the shift allowance control.

In addition, the vehicle control system of the invention further comprises corner continuity decide means for deciding whether the corner continues.

Further, the suppress means suppresses the number of determinations of the recommended gear stage when the corner continues.

According to the invention, there is also provided a recording medium stored with programs for determining a recommended gear stage of an automatic transmission matched to a vehicle speed and road situations; for setting an upper limit gear stage on the basis of the recommended gear stage; for making a speed change at the upper limit gear stage; and for suppressing the number of determinations of the recommended gear stage at a corner.

BRIEF DESCRIPTION OF THE DRAWINGS

The invention will be described with reference to the drawings, in which.

DETAILED DESCRIPTION OF PREFERRED EMBODIMENTS

Figure 1:
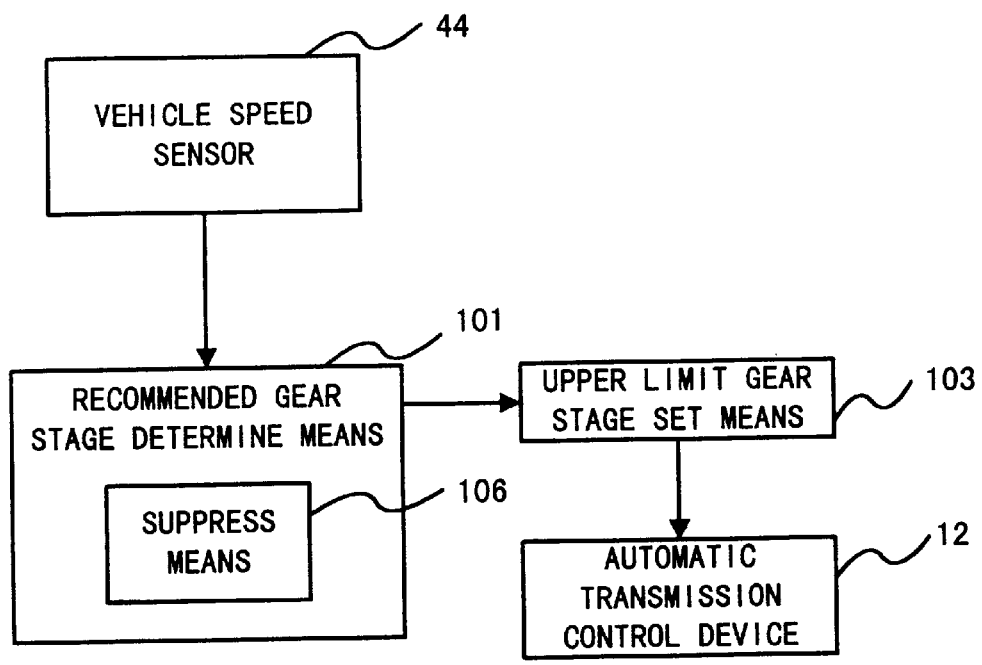
FIG. 1 is a block diagram showing the functions of a vehicle control system according to a first embodiment of the invention.

FIG. 1 shows the functions of a vehicle control system according to a first embodiment of the invention. An automatic transmission control device 12 acts as a shift means, a vehicle speed sensor 44 detects the speed of the vehicle, a recommended gear stage determining means 101 is provided for determining a recommended gear stage of an automatic transmission appropriate to the vehicle speed and road situations, an upper limit gear stage set means 103 sets an upper limit gear stage on the basis of the recommended gear stage, and suppress means 106 suppresses the number of determinations of the recommended gear stage. The automatic transmission control device changes the speed at the upper limit gear stage.

Figure 2:
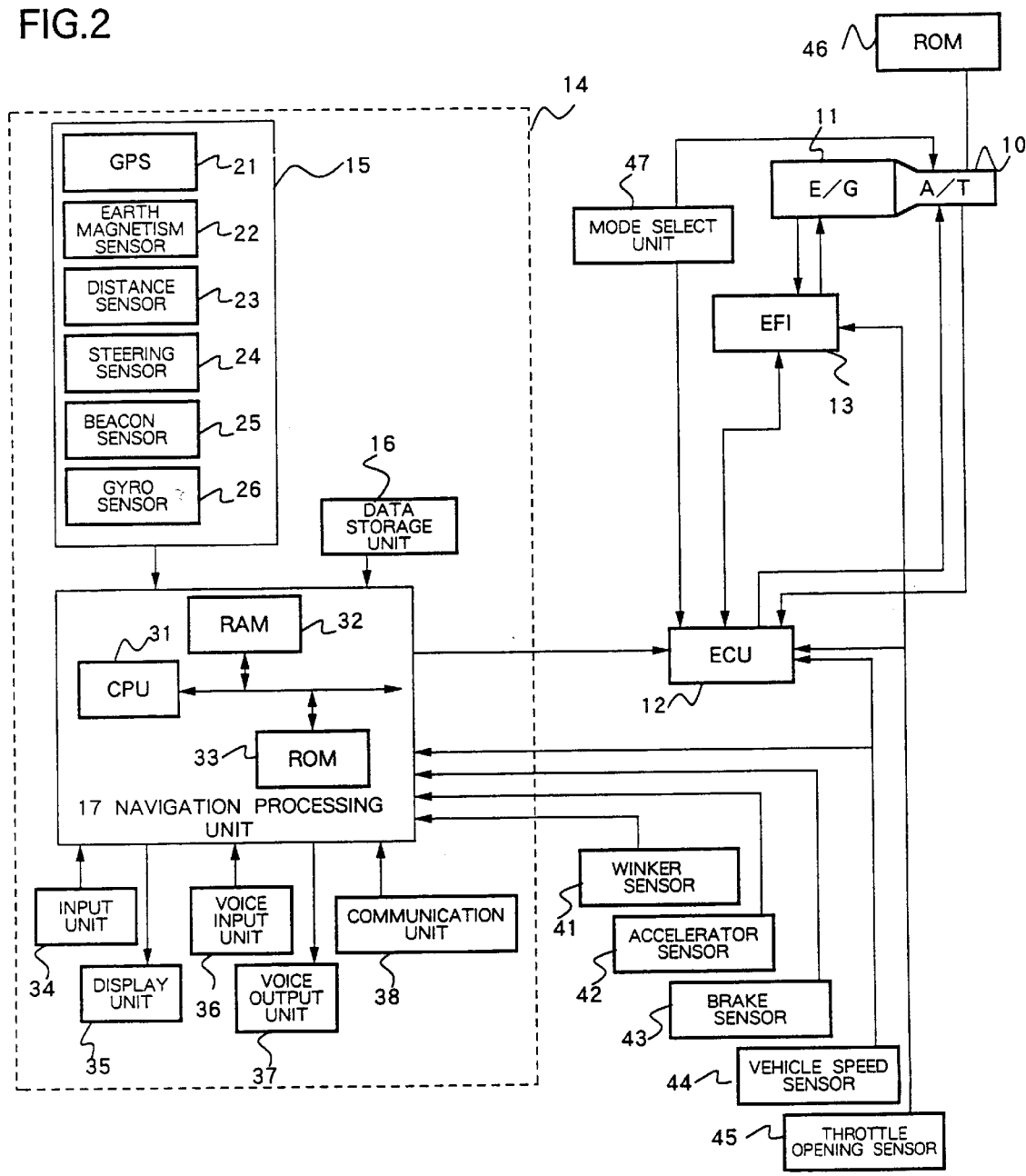
FIG. 2 is a schematic diagram showing the vehicle control system according to the first embodiment of the invention.
Figure 3:
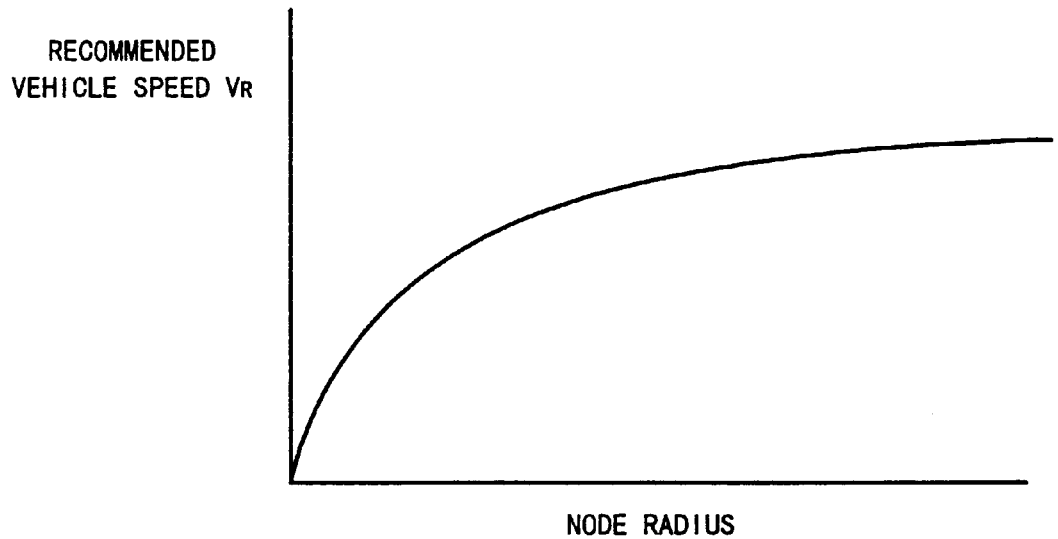
FIG. 3 is a diagram illustrating a recommended vehicle speed map in the first embodiment of the invention.
Figure 4:
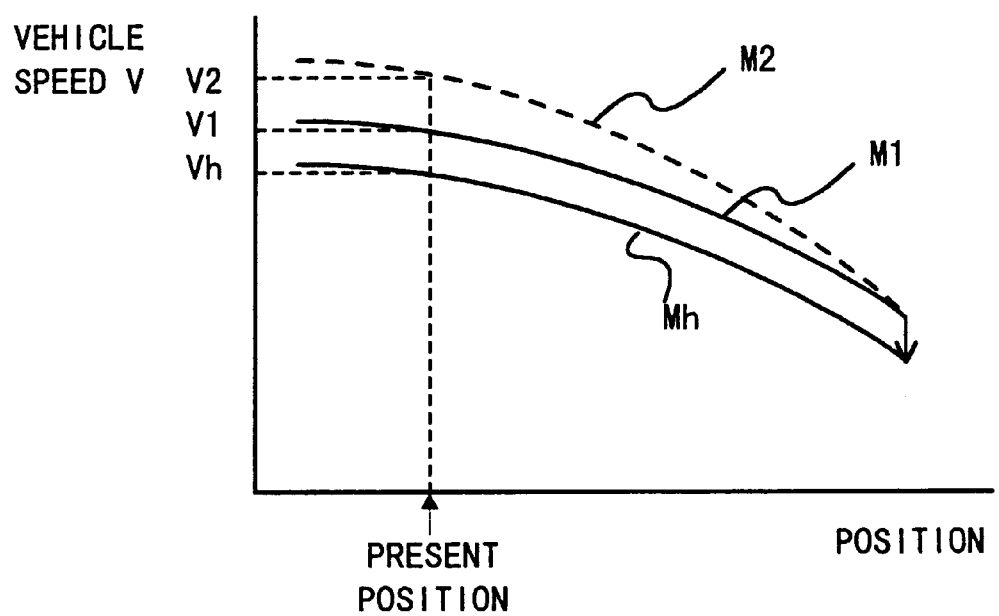
FIG. 4 is a diagram exemplifying a deceleration line map in the first embodiment of the invention.

FIG. 2 is a schematic diagram showing the vehicle control system according to the first embodiment of the invention; FIG. 3 is a diagram illustrating a recommended vehicle speed map in the first embodiment of the invention; and FIG. 4 is a diagram exemplifying a deceleration line map in the first embodiment of the invention. In FIG. 3, the abscissa represents a node radius whereas the ordinate represents a recommended vehicle speed $V_R$. In FIG. 4, the abscissa represents the position of a vehicle whereas the ordinate represents a vehicle speed V.

FIG. 2 shows an automatic transmission (A/T) 10; an engine (E/G) 11; an automatic transmission control device (ECU) 12 that controls the entire automatic transmission 10; an engine control unit (EFI) 13 that controls the engine 11; and a navigation system 14.

Also shown are a winker, or turn signal, sensor 41; an accelerator sensor 42 that detects the operation of the driver with respect to the accelerator pedal; a brake sensor 43 for detecting the driver's operation of the brake; a vehicle speed sensor 44; a throttle opening sensor 45; a ROM 46; and a mode select unit 47 used to select between an ordinary mode and a navigation mode.

The navigation system 14 includes a present position detect unit 15, a data storage unit 16, a navigation processing unit 17 that performs various operations, such as producing navigation guidance on the basis of input information, an input unit 34, a display unit 35, a voice input unit 36, a voice output unit 37, and a communication unit 38.

Moreover, the present position detect unit 15 includes a Global Positioning System (GPS) sensor 21, an earth magnetism sensor 22, a distance sensor 23, a steering sensor 24, a beacon sensor 25, a gyro sensor 26, an altimeter (not-shown), and other sensors for receiving position data as appropriate so that it determines the present position of the vehicle using the data provided by the sensors.

The GPS sensor 21 detects the position of the vehicle on the earth by receiving signals transmitted by plurality of satellites, normally at least three satellites; the earth magnetism sensor 22 detects the azimuth, in which the vehicle is directed, by monitoring metering the earth's magnetic field; and the distance sensor 23 detects the distance between predetermined points on the road. The distance sensor 23 used, for example, is one that detects the distance based on detecting the RPM of the wheels or is one that measures acceleration and by integrating it twice determines distance traveled.

The steering sensor 24 detects the steering angle. Examples of a steering sensor 24 that can be used are an optical rotation sensor attached to the turning portion of a handle (not-shown) or an angular sensor attached to a rotary resistor or a wheel.

The beacon sensor 25 detects the position of the vehicle by receiving positional information from the beacons arranged along the road. The gyro sensor 26 detects the angular velocity of rotation of the vehicle and is exemplified by a gas rate gyro or a vibratory gyro. Thus, the azimuth, in which the vehicle is directed, can be detected by integrating the angular velocity of rotation, as detected by the gyro sensor 26.

Here, the GPS sensor 21 and the beacon sensor 25 can detect the position of the vehicle independently of each other. In the case of the distance sensor 23, however, the position of the vehicle can be determined by combining the distance detected by the distance sensor 23 and the azimuth which is detected by the earth magnetism sensor 22 and the gyro sensor 26. The position of the vehicle can also be determined by combining the distance detected by the distance sensor 23 and the steering angle detected by the steering sensor 24.

Moreover, the data storage unit 16 contains a map data file, an intersection data file, a node data file, a road data file, a photograph data file, and other data files containing information about defined areas, such as hotels, gas stations and sightseeing guides located in the areas. The data files are stored with not only the data for searching the route but also data for displaying on the screen of the display unit 35 guide maps along the searched route, photographs or frame maps for intersections or along the route, distance to a next intersection or the direction to be taken at the next intersection, and other guide information. The data storage unit 16 further contains various data for activating the voice output unit 37 to output the predetermined information.

Specifically, the intersection data file contains intersection data for the individual intersections; the node data file contains node data for the nodes that are used to define the roads; and the road data file contains road data for the individual roads. The intersection data, node data and road data define the road structure. The node data are composed of elements indicating the position and the shape of the individual roads of the map data and include data indicating the individual nodes and the links (or lines) joining the nodes. Moreover, the road data indicate the width, the gradient, the cant, the bank, the surface state, the number of lanes, the lane number reducing point, the width narrowing point and other pertinent data describing the roads; the radii of curvature, the intersections, the T roads, the entrances and other data for defining the corners; and the railroad crossings, the ramps at the exits of highways, the toll gates on the highways, uphills, downhills, the class of each road (national or ordinary roads, highways and so on) and other data as appropriate for the road attributes.

The navigation processing unit 17 includes a CPU 31 for controlling the navigation system 14; a RAM 32 used as a working memory for the CPU 31 to perform the various operations; and a ROM 33 used as a recording medium that stores various programs for searching the route to a destination, for providing guidance along the roads on the route and for determining a specific section. The navigation processing unit 17 is electronically connected to the input unit 34, the display unit 35, the voice input unit 36, the voice output unit 37 and the communication unit 38. The ROM 33 is made of a magnetic core (not-shown), semiconductor memory or the like as known to those skilled in the art.

Here, the aforementioned data storage unit 16 and ROM 33 can be replaced by a variety of recording media, such as magnetic tape, magnetic disk, floppy disk, magnetic drum, CD, MD, optical disk, IC card or optical card.

In this embodiment, the ROM 33 stores the necessary programs, and another memory, or the data storage unit 16, stores the necessary data. However, the programs and data can be stored in a common external recording medium. In this modification, for example, the navigation processing unit 17 can be equipped with a flash memory (not-shown) so that the programs and data can be read out from the external recording medium and written into the flash memory. Then, the programs and data can be updated by replacing the external recording medium. In addition, the control programs, or the like, for the automatic transmission control device 12 can be stored together in the external recording medium. Thus, the necessary programs, as stored in the various recording media, can be started to perform the required operations on the basis of the data.

In addition, the communication unit 38 is provided for transmitting/receiving the various data using a FM transmitter or over the telephone lines. The communication unit 38 receives data, such as road jam information or traffic accident information, as provided by an information center (not-shown) or the like, or D-GPS information provided as a detection error of the GPS sensor 21. Here, the programs and data for realizing the functions of the invention could be received at least partially by the communication unit 38 and stored in the flash memory or other provided memory or storage area.

Moreover, the input unit 34 is provided for correcting the position at the start of a drive and for inputting a destination. The input unit 34 can use a keyboard, a mouse, a bar code reader, a write pen or a remote control unit arranged separately of the display unit 35. Alternatively, as here, the input unit 34 is a touch panel which is enabled to provide an input by touching a key or menu displayed on the image of the display unit 35.

The display unit 35, moreover, displays an operation guide, a operation menu, a guide to the operation keys, a route to the destination, a guide along the route to be followed, and other appropriate displays. The display unit 35 can be a CRT display, a liquid crystal display, a plasma display, a hologram device for projecting a hologram on the wind shield, or any other display that allows rapid assimilation of the displayed data by a driver or vehicle occupant.

The voice input unit 36 is a microphone (not-shown) or other sound pick-up device that enables input of the necessary information by voice. The voice output unit 37 is equipped with a voice synthesizer or speaker (not shown) so that the guide information is output vocally from a speaker. Here, in addition to the voice thus synthesized, the guide information can also be recorded on a tape so that it can be outputted from the speaker at a later time after development.

In the vehicle control system thus structured, the automatic transmission control device 12 makes the speed changes for an upshift or downshift in accordance with the control programs stored in the ROM 46.

When the driver operates the mode select unit 47 to select the ordinary mode, the automatic transmission control device 12 refers to a shift map (not-shown) in the ROM 46 using the vehicle speed V, as detected by the vehicle speed sensor 44, and the throttle opening, as detected by the throttle opening sensor 45, to select a gear stage corresponding to the vehicle speed V and the throttle opening.

When the driver operates the mode select unit 47 to select the navigation mode, the navigation processing unit 17 restricts the gear stage if the predetermined road situations are read out from the data storage unit 16, and the predetermined conditions are satisfied. A predetermined condition is, for example, releasing the accelerator pedal (not-shown). Then, the automatic transmission control device 12 changes the speed at the restricted upper limit gear stage. Here, the operations similar to those at the time when the navigation mode is selected could also be performed at all times by the navigation processing unit 17.

The actions of the navigation processing unit 17 at the time when the navigation mode is selected will now be described.

In this case, the CPU 31 starts a corner control as the vehicle comes to a corner. In the corner control, an optimum recommended gear stage for rounding, or turning, the corner is determined by the recommended gear stage determine means 101 (FIG. 1) of the CPU 31, and the upper limit gear stage is set by the upper limit gear stage set means 103 on the basis of the recommended gear stage and the operation of the driver so that it is outputted to the automatic transmission control device 12.

When the vehicle comes to a corner, the CPU 31 starts the corner control. In the corner control, for the recommended gear stage determine means 101 (FIG. 1) of the CPU 31 to determine at first the optimum recommended gear stage for turning the corner, the CPU 31 determines the road situation. When the present position is detected by the present position detect unit 15 and recognized by the present position recognize means 102, the CPU 31 calculates the radius of curvature of a road including the recognized present position, i.e., the node radius for each node within a predetermined range (for example, 1 to 2 Km from the present position on the road). Here, the route from the present position to the destination could also be searched, if necessary, to calculate the node radius for all the nodes on the searched route. In this case, the node radius can be calculated by performing the operations on the basis of the absolute coordinates of the individual nodes and the individual absolute coordinates of two nodes adjoining the nodes in accordance with the road data. Alternatively, the data storage unit 16 could have stored therein the node radii as part of the road data for the individual nodes so that the node radii might be read out as the vehicle runs along the identified route.

Next, the CPU 31 starts the corner control, if a node having a smaller radius than a threshold value is detected within a predetermined range from the present position of the vehicle, the CPU 31 reads a recommended vehicle speed $V_R$ corresponding to the node radius by referencing a recommended vehicle speed map, such as shown in FIG. 3. In the recommended vehicle speed map, the recommended vehicle speed $V_R$ is lower for a smaller node radius and higher for a larger node radius. Next, the CPU 31 calculates the gradients of the roads from the present position to the individual nodes.

In this embodiment, when the vehicle comes to a corner, it is determined what deceleration of the vehicle speed V is necessary to reach the recommended vehicle speed $V_R$ by the time the vehicle goes from the present position to the position of the corner. When one, or more, of the individual nodes within the predetermined range from the present position is identified as a node having a radius smaller than the threshold value, the recommended vehicle speed $V_R$ is calculated and used to determine a recommended gear stage.

Subsequently, the CPU 31 sets, for each specific node a decelerating acceleration reference value α indicating a threshold value deemed desirable for keeping the present gear stage; a decelerating acceleration reference value β1 indicating a threshold value deemed desirable for setting the gear stage to a third or lower speed, if the decelerating acceleration (or the rate of deceleration) is higher; and a decelerating acceleration reference value β2 indicating a threshold value deemed desirable for setting the gear stage to a second or lower speed if the decelerating acceleration is even higher.

The individual decelerating acceleration reference values α, β1 and β2 are set by also considering the gradients of the road. It is necessary to do so because the decelerating accelerations are different for running over a distance when on a flat and when on an uphill or downhill. When the driver has an intention to decelerate the vehicle on an uphill, for example, a sufficient deceleration can, many times, be achieved without a positive speed change for the downshift.

It is also possible to set a plurality of individual decelerating acceleration reference values a, β1 and β2 based on the known gradients of the roads. Moreover, one set of decelerating acceleration reference values α, β1 and β2 could be set in advance based on a flat road which are corrected according to the actual gradients calculated. Moreover, the total weight of the vehicle can be considered and calculated so that the individual decelerating acceleration reference values α, β1 and β2 might be different when there is only one person in the vehicle and when there are more, for example, four people. In this modification, the total vehicle weight could be calculated on the basis of the acceleration at the time when a specific output shaft torque is generated, for example.

Subsequently, the CPU 31 calculates the section distance L from the present position to each node; a hold controlling deceleration line $M_h$ for keeping the present gear stage on the basis of the recommended vehicle speed $V_R$, the section line L and the decelerating acceleration reference value α; and shift allowance controlling deceleration lines $M_1$ and $M_2$ for allowing the downshift, on the basis of the section distance L, the recommended vehicle speed $V_R$ and the decelerating acceleration reference values β1 and β2. Here, the holding controlling deceleration line $M_h$ is lower by 10 Km/h, for example, than the shift allowance controlling deceleration line $M_1$ in a manner to correspond to the shift allowance controlling deceleration line $M_1$. On the other hand, the hold controlling deceleration line $M_h$ could be displaced by a predetermined distance from the shift allowance controlling deceleration line M1.

In this case, the shift allowance controlling deceleration lines $M_1$ and $M_2$ indicate the values of the vehicle speed V at which the vehicle can run through each node at the recommended vehicle speed $V_R$ when the decelerations are performed at the decelerating acceleration reference values β1 and β2 at the section distance L.

Subsequently, the recommended gear stage determine means 101 calculates the value $V_h$ of the hold controlling deceleration line $M_h$ corresponding to the present position, and the individual values $V_1$ and $V_2$ of the shift allowance controlling deceleration lines $M_1$ and $M_2$ corresponding to the present position, and reads the present vehicle speed $V_{now}$ to compare the vehicle speed $V_{now}$ with the foregoing values $V_h$, $V_1$ and $V_2$.

When the vehicle speed $V_{now}$ is at the value $V_h$ or higher, moreover, the hold control is started. In the hold control, the prevailing actual gear stage (which will be called the "actual gear stage") is held till the vehicle speed $V_{now}$ reaches the value $V_1$, so that a higher gear stage than the actual gear stage is not outputted. In the case of the actual gear stage at the 4th speed, therefore, the recommended gear stage is determined to the 4th speed.

When the vehicle speed $V_{now}$ is at the value $V_1$ or higher, on the other hand, the shift allowance control is started to determine the recommended gear stage is the 3rd speed. When the vehicle speed $V_{now}$ is at the value $V_2$ or higher, moreover, the recommended gear stage is determined to be the 2nd speed by the shift allowance control. Here, the recommended gear stage is determined for each specific node, and its minimum value is selected.

On the other hand, both the hold controlling deceleration line $M_h$ and the shift allowance controlling deceleration lines $M_1$ and $M_2$ can be calculated not only by the operations described but also with reference to a map which is stored with operational results.

Subsequently, the upper limit gear stage set means 103 decides which of the 2nd, 3rd and 4th speeds the recommended gear stage determined by the recommended gear stage determine means 101 is at, and sets a value $S_s$ for determining the upper limit gear stage to 4 when the recommended gear stage is at the 4th speed. In case the recommended gear stage is the 3rd speed, the upper limit gear stage set means 103 sets the value $S_s$ to 3, when the depressed accelerator pedal is released to effect the accelerator ON→OFF or when the not-depressed brake pedal is depressed to effect the brake OFF→ON. In case the recommended gear stage is the 2nd speed, on the other hand, the upper limit gear stage set means 103 sets the value $S_s$ to 2, when the brake OFF→ON. In this case, the accelerator ON→OFF means the state in which the depression of the accelerator pedal, as detected by the accelerator sensor, is reduced by 10% or more for a unit time period and in which the accelerator sensor is OFF.

Here, the recommended gear stage is the 3rd speed, unless the accelerator ON→OFF and unless the brake OFF→ON, the upper limit gear stage set means 103 sets the value $S_s$ to 4. The recommended gear stage is the 2nd speed unless the brake OFF→ON, on the other hand, the upper limit gear stage set means 103 sets the value $S_s$ to 3.

Subsequently, the upper limit gear stage set means 103 decides whether the gear setting is in the hold control, and detects the actual gear stage by the gear stage detect means not-shown if in the hold control. Moreover, the upper limit gear stage set means 103 sets the value $S_h$ for determining the upper limit gear stage to 3 if the actual gear stage is at the 3rd speed or lower, and to 4 if the actual gear stage is higher than the 3rd speed. Thus, the upper limit gear stage is prevented from going higher than the actual gear stage. If not in the hold control, on the other hand, the upper limit gear stage set means 103 sets the value $S_h$ to 4.

When the first and second values $S_s$ and $S_h$ are thus determined, the upper limit gear stage set means 103 sets the gear stage corresponding to the lower one of the first and second values $S_s$ and $S_h$, as the upper limit gear stage, and outputs the upper limit gear stage to the automatic transmission control device 12. When the upper limit gear stage is outputted, moreover, the automatic transmission control device 12 performs the speed change at the upper limit gear stage. When the node radius of the road exceeds the threshold value, the corner control is released to the ordinary control.

When a corner continues in the road on which the vehicle runs, on the other hand, the upper limit gear stage is frequently changed if the gear stage is repeatedly set, to lower the drive feeling.

In this embodiment, therefore, the navigation processing unit 17 decides whether the corner continues by a corner continuation decide means (not-shown) of the CPU 31. When the corner continues, the decelerating acceleration reference value α is reduced by a set value Δα by the suppress means 106.

In this case, whether the corner continues is decided as follows. On the basis of the individual absolute coordinates of the individual nodes and the individual absolute coordinates of the two nodes adjoining each individual node, more specifically, an angle γ, as made by the two adjoining links of each node, is calculated, and a total angle Σγ is calculated by summing the absolute values of the angles γ of the individual nodes existing in the set range of the corner. Thus, it is decided that the corner continues, if the total angle Σγ is equal to or greater than a threshold value, but it is decided that the corner does not continue if the total angle $\Sigma\gamma$ is smaller than the threshold value.

This widens the range for the hold control so that the number of determinations of the recommended gear stage can be reduced to prevent the gear stage from being frequently changed. As a result, the drive feeling can be improved.

In this embodiment, the decelerating acceleration reference values $\alpha$ and $\beta1$ are changed when the corner continues. However, the decelerating acceleration reference values $\alpha$ and $\beta1$ could be changed by the suppress means 106 when the corner control is first started regardless whether the corner continues.

Figure 5:
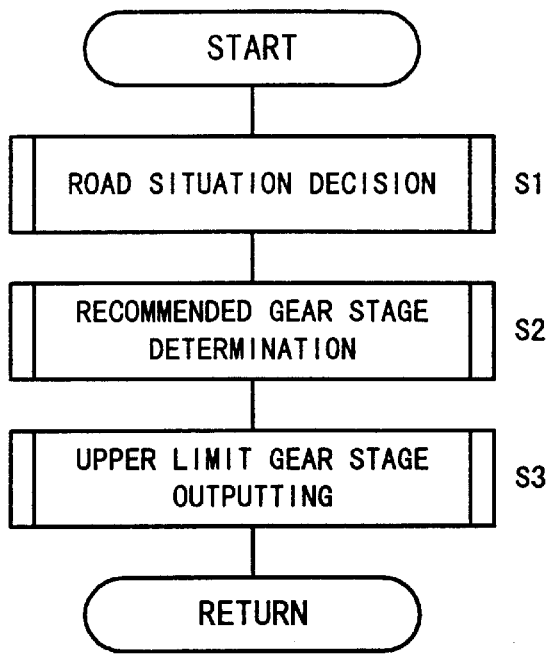
FIG. 5 is a flow chart showing the actions of a navigation processing unit in the first embodiment of the invention.

FIG. 5 is a flow chart showing an overview of the actions of a navigation processing unit in the first embodiment of the invention. In step S1 the road situation is determined and in step S2 a recommended gear stage is determined. In step S3 the upper limit gear stage is output.

Figure 6:
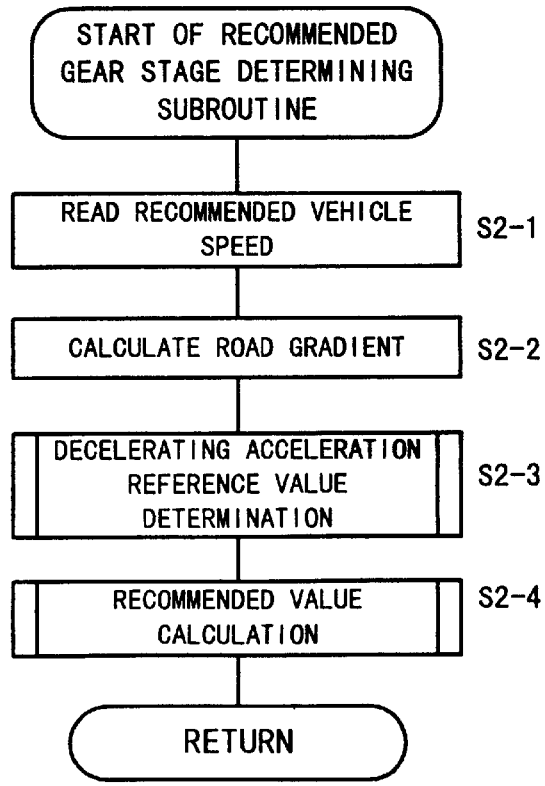
FIG. 6 is a flow chart showing a recommended gear stage determining subroutine in the first embodiment of the invention.

The recommended gear stage determining subroutine of step S2 as shown in FIG. 5 is shown in FIG. 6.

In step S2-1 the recommended vehicle speed $V_R$ is determined using node radius data. The map of FIG. 3 shows a way of making the determination. The gradient of the road from the present position to each node is calculated in step S2-2 and the decelerating acceleration reference values are determined in step S2-3.

Finally, the recommended decelerating acceleration reference values are calculated in step S2-4. The details of these steps have been previously discussed.

Figure 7:
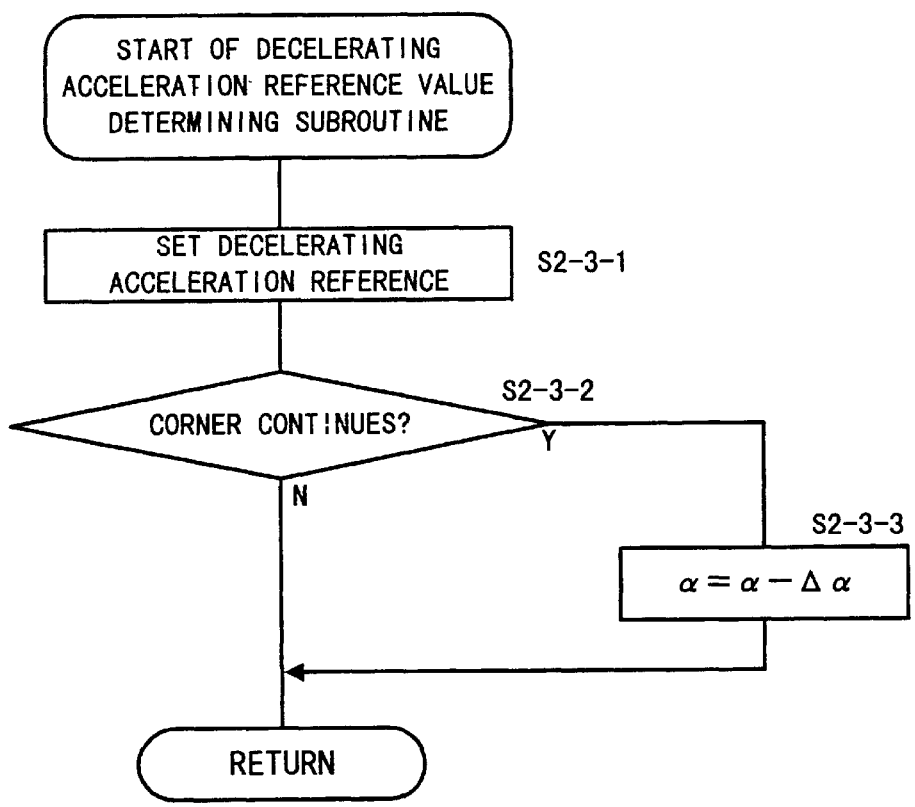
FIG. 7 is a flow chart showing a decelerating acceleration reference value determining subroutine in the first embodiment of the invention.

The decelerating acceleration reference value determining subroutine of Step S2-3 is shown in detail in FIG. 7. In step S2-3-1 the decelerating acceleration reference values $\alpha$, $\beta1$ and $\beta2$ are set. Then, in step S2-3-2 it is determined whether the corner continues. If the corner continues, the subroutine advances to step S2-3-3, otherwise the subroutine is returned. In step S2-3-3 the decelerating acceleration reference value $\alpha$ is set to a value which is calculated by subtracting the set value from the decelerating acceleration reference value $\alpha$.

Figure 8:
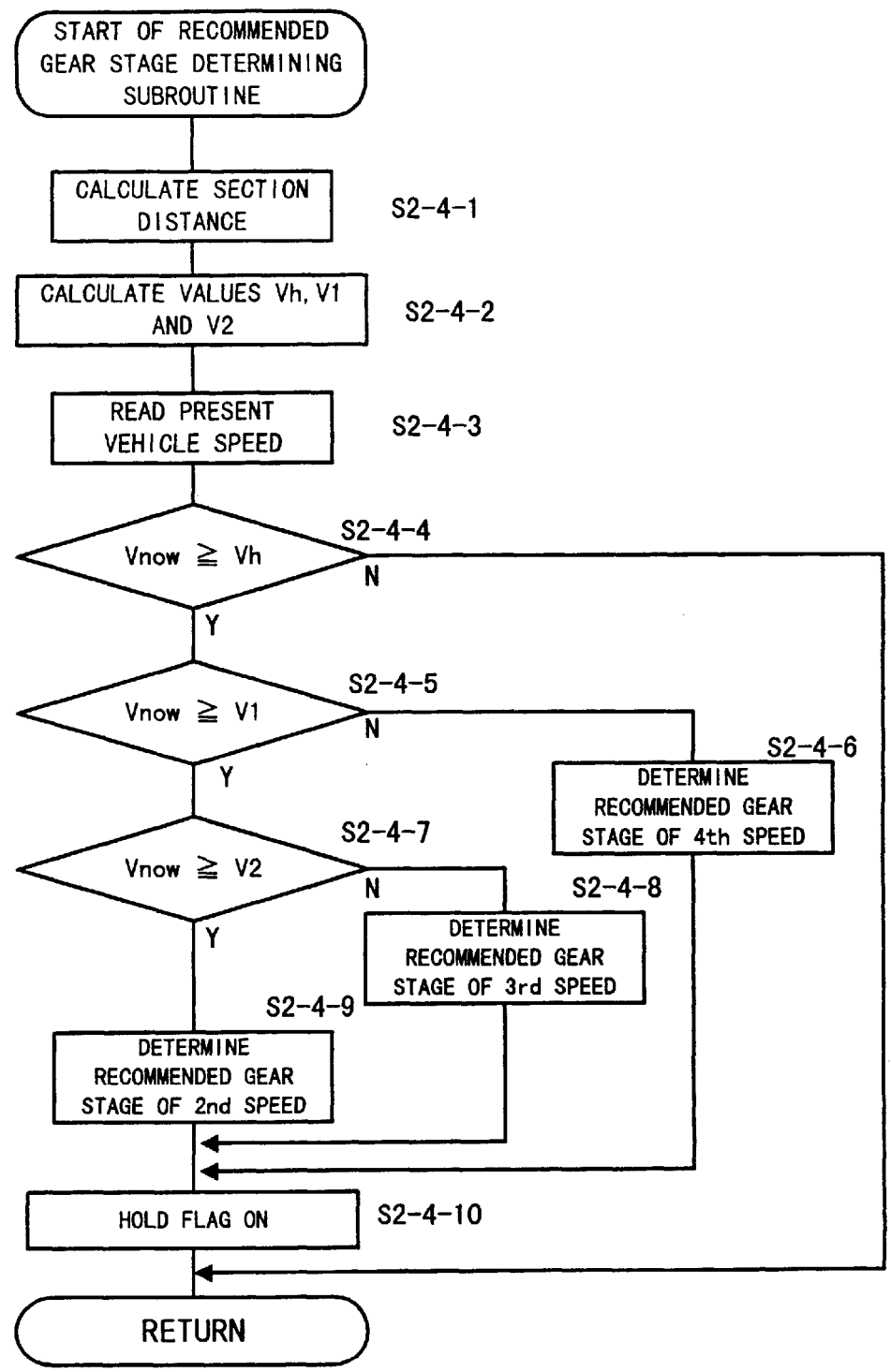
FIG. 8 is a flow chart showing a recommended value calculating subroutine in the first embodiment of the invention.

The recommended value calculating subroutine of step S2-4 of FIG. 6 is shown in FIG. 8. In step S2-4-1 the section distance L from the present position to each node is calculated. Then in step S2-4-2 the values $V_h$ (FIG. 4), $V_1$ and $V_2$ are calculated. In step S2-4-3 the present vehicle speed $V_{now}$ is read in and in step S2-4-4 it is determined whether the vehicle speed $V_{now}$ is greater than or equal to the value $V_h$. If Yes, the subroutine goes to step S2-4-5 and if No, the subroutine is returned.

In step S2-4-5 it is determined whether the vehicle speed $V_{now}$ is greater than or equal to the value $V_1$. If Yes, the subroutine advances to step S2-4-7 and if No, to step S2-4-6. When the subroutine advances to step S2-4-6, the recommended gear stage is determined is the 4th speed.

In step S2-4-7 it is determined whether the vehicle speed $V_{now}$ is greater than or equal to the value $V_2$. If Yes, the subroutine advances to step S2-4-9, and if No to step S2-4-8. When the subroutine advances to step S2-4-8 the recommended gear stage is determined is the 3rd speed.

In step S2-4-9 the recommended gear stage is determined is the 2nd speed. Then, in step S2-4-10 a hold flag is set indicating the hold control is turned ON.

Figure 9:
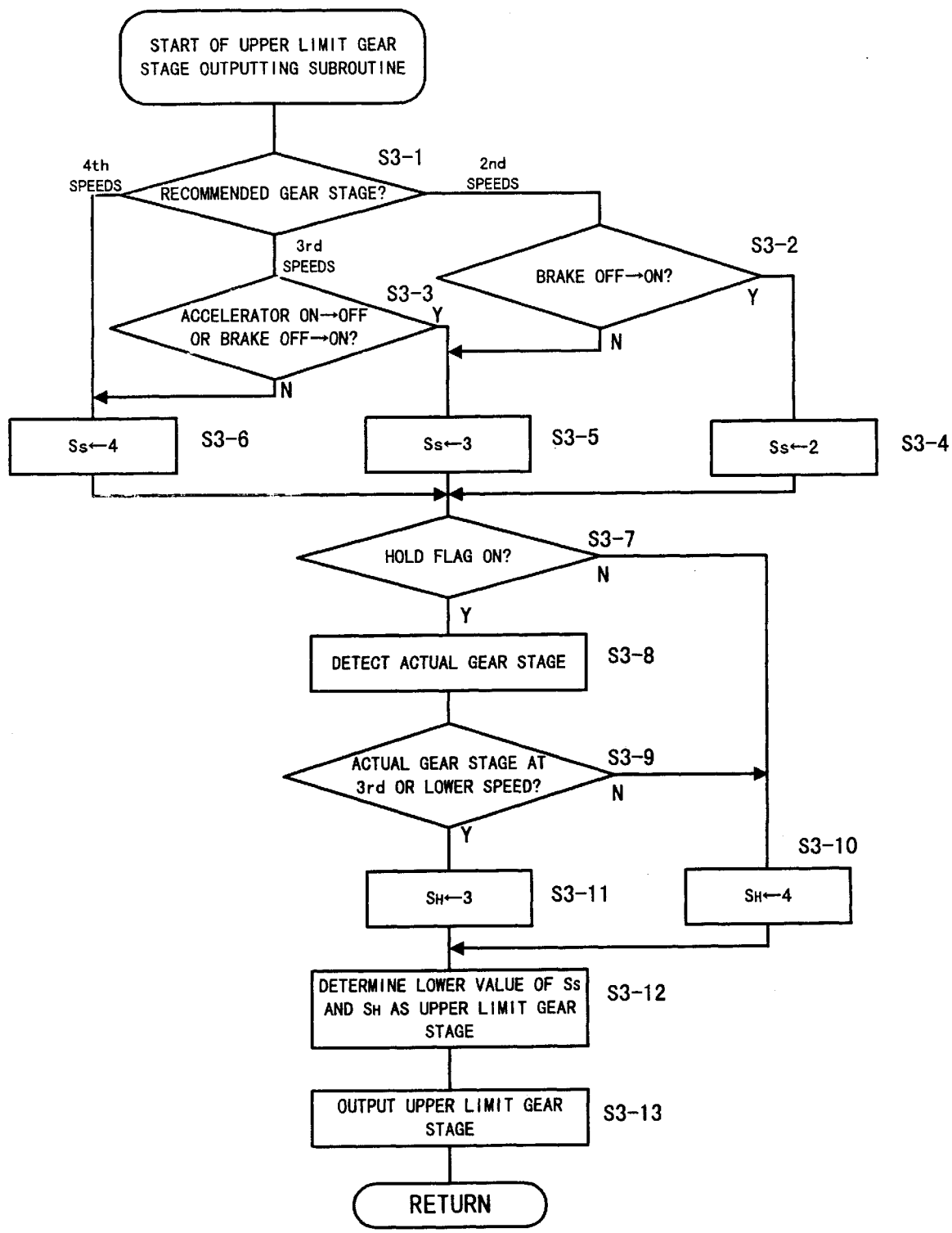
FIG. 9 is a flow chart showing a second upper limit gear stage outputting subroutine in the first embodiment of the invention.

The upper limit gear stage outputting subroutine of step S3 of FIG. 5 will be described with reference to FIG. 9.

In step S3-1 it is determined which of the 2nd, 3rd and 4th speeds is the recommended gear stage determined by the recommended gear stage determine means 101 (FIG. 1). The subroutine advances to step S3-2 if the recommended gear stage is the 2nd speed; to step S3-3 if the recommended gear stage is the 3rd speed; and to step S3-6 if the recommended gear stage is at the 4th speed. At step S3-2 it is determined whether the brake OFF→ON. If Yes, the subroutine advances to step S3-4, if No, to step S3-5.

In step S3-3 it is determined whether accelerator ON→OFF or the brake OFF→ON. When Yes, the subroutine advances to step S3-5 and if No to step S3-6. In step S3-4 the first value $S_s$ is set to 2; in step S3-5 to 3; and in step S3-6 to 4.

In step S3-7 it is determined whether the hold flag is ON. If Yes the subroutine advances to step S3-8 and if No to step S3-10. In step S3-8 the actual gear stage is detected.

In step S3-9 it is determined whether the actual gear stage is at the 3rd speed or lower. If Yes, the subroutine advances to step S3-11, if No to step S3-10. In step S3-10 the second value $S_H$ is set to 4 whereas in step S3-11 the second value $S_H$ is set to 3.

In step S3-12 the lower one of the values $S_s$ and $S_H$ is determined as the upper limit gear stage and, in step S3-13, the upper limit gear stage is output to the automatic transmission control device 12.

Figure 10:
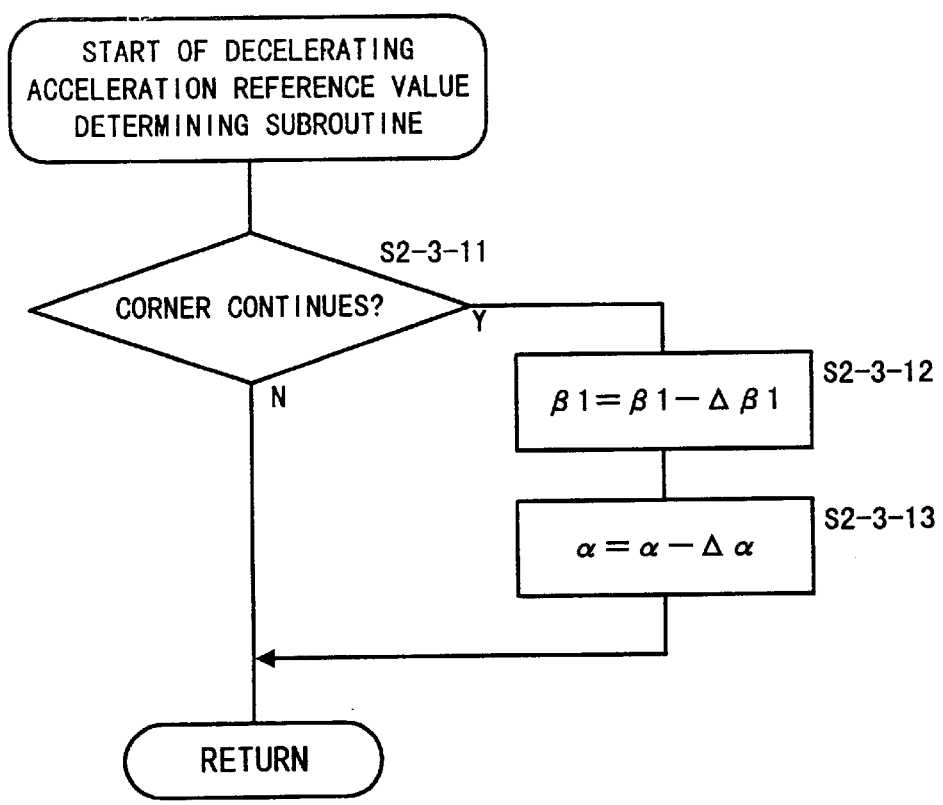
FIG. 10 is a flow chart showing a decelerating acceleration reference value determining subroutine in a second embodiment of the invention.

FIG. 10 is a flow chart showing a decelerating acceleration reference value determining subroutine in a second embodiment of the invention. Here, the complete routine will not be described because the procedure, or other routines and subroutines, other than the decelerating acceleration reference value determining subroutine are identical to that of the first embodiment.

In the decelerating acceleration determination, the decelerating acceleration reference value $\beta1$ is reduced by the set value $\Delta\beta1$ by the suppress means 106 of the recommended gear stage determining means 101 (FIG. 1) and the decelerating acceleration reference value $\alpha$ is accordingly reduced by the value $\Delta\alpha$.

Since the area for the shift allowance control is widened, therefore, the number of determinations of the recommended gear stage can be reduced to prevent a frequent change in the gear stage. As a result, the drive feeling is improved.

In this second embodiment, in step S2-3-11 it is determined whether the corner continues. If Yes, the subroutine advances to step S2-3-12 but returns if No. In step S2-3-12 the decelerating acceleration reference value $\beta1$ is adjusted to a value calculated by subtracting the set value $\Delta\beta1$ from the decelerating acceleration reference value $\beta1$ and in step S2-3-13 the decelerating acceleration reference value $\alpha$ is adjusted to a value calculated by subtracting the set value $\Delta\alpha$ from the decelerating acceleration reference value $\alpha$.

In this embodiment, the decelerating acceleration reference value $\beta1$ is reduced by the set value $\Delta\beta1$ to widen the area for the shift allowance control. By the suppress means 106, however, the conditions for releasing the corner control could be changed to widen the area of the shift allowance control.

In the foregoing first and second embodiments, whether the corner continues is determined to change the decelerating acceleration reference values $\alpha$, $\beta1$ and $\beta2$ if the corner continues. When the corner control is first started, the decelerating acceleration reference values $\alpha$, $\beta1$ and $\beta2$ could be changed by the suppress means 106 disregarding whether the corner continues.

Figure 11:
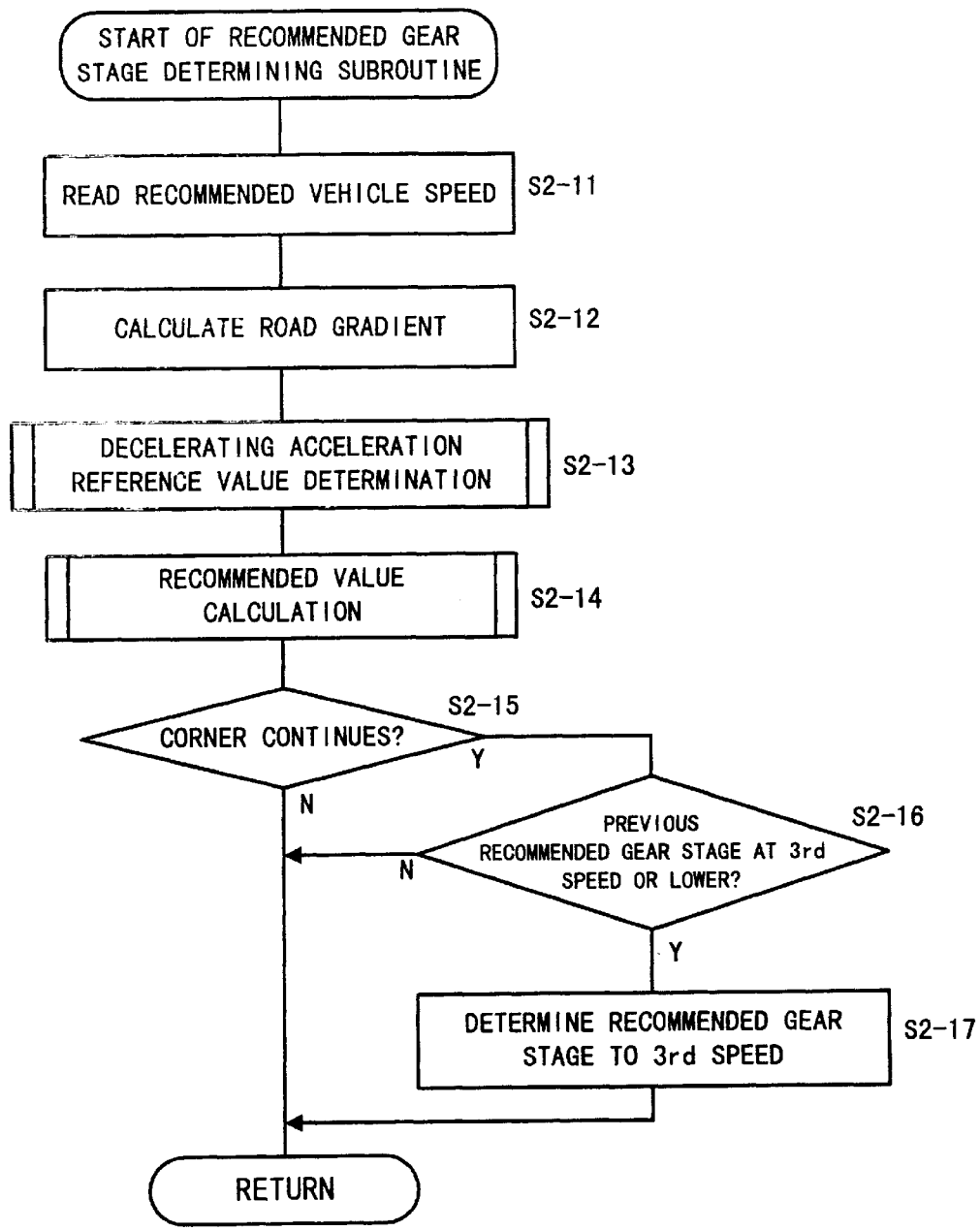
FIG. 11 is a flow chart showing a recommended gear stage determining subroutine in a third embodiment of the invention.

FIG. 11 is a flow chart showing a recommended gear stage determining subroutine for a third embodiment of the invention. Only the recommended gear stage determining subroutine will be described as all other routines/subroutines are identical to those of the first embodiment.

In this embodiment, the decelerating acceleration reference value α is not changed, when it is to be determined, even if the corner continues. After the end of the recommended value calculation, moreover, it is determined by the corner continuation decide means (not shown) of the CPU 31 (FIG. 2) whether the corner continues. If the corner continues, it is determined by the recommended gear stage determine means 101 (FIG. 1) whether the previous recommended gear stage is the 3rd speed or lower. If the previous recommended gear stage is the 3rd speed or lower, the recommended gear stage at this time is set to the 3rd speed.

As a result, the recommended gear stage is kept at the 3rd speed till the corner is completed, so that the upper limit gear stage output from the navigation processing unit 17 to the automatic transmission control device 12 is the 3rd speed. As a result, frequent change in the gear stage is prevented and the drive feeling is improved.

In the subroutine, at step S2-11 the recommended vehicle speed $V_R$ is read and at step S2-12 the gradient of the road to the node is calculated.

In step S2-13 the decelerating acceleration reference value determination is made and at step S2-14 a recommended value is calculated. In step S2-15 it is determined whether the corner continues. If Yes, the subroutine advances to step S2-16 but if No, the subroutine is returned. Then in step S2-16 it is determined whether the previous recommended gear stage is the 3rd speed or lower. If Yes, the subroutine advances to step S2-17 and if No is returned. At step S2-17 the recommended gear stage is determined to be the 3rd speed.

The invention should not be limited to the foregoing embodiments but can be modified in various manners on the basis of its gist, and these modifications should not be excluded from the scope of the invention.

According to the invention, as has been described in detail, the vehicle control system comprises the vehicle speed sensor for detecting the speed of the vehicle; the recommended gear stage determine means for determining the recommended gear stage of the automatic transmission, as matching the vehicle speed and the road situation; the upper limit gear stage set means for setting the upper limit gear stage on the basis of the recommended gear stage; and the shift means for changing the speed at the upper limit gear stage.

Moreover, the recommended gear stage determine means includes the suppress means for suppressing the number of determinations of the recommended gear stage at a corner.

In this case, the number of determinations of the recommended gear stage is suppressed during cornering to prevent a frequent change in the gear stage. As a result, the drive feeling is improved.

In the vehicle control system of the invention, moreover, the recommended gear stage determine means performs the hold control to keep the present gear stage, when the vehicle speed exceeds the first set value, and the shift allowance control to allow the downshift when the vehicle speed exceeds the second set value.

In this case, the number of determinations of the recommended gear stage is suppressed either by widening the area of the hold control or by widening the area of the shift allowance control. As a result, a frequent change in the gear stage is prevented improving the drive feeling.

Still another vehicle control system of the invention further comprises the corner continuity decide means for determining whether the corner continues. Moreover, the suppress means suppresses the number of determinations of the recommended gear stage when the corner continues. In this case, the number of determinations of the recommended gear stage is suppressed, when the corner continues, so that the number of determinations of the recommended gear stage can be reduced to accordingly prevent a frequent change in the gear stage. As a result, the drive feeling is improved.

What is claimed is:

1. A vehicle control system, comprising:

a vehicle speed sensor that detects the speed of a vehicle;

memory means for storing road information;

vehicle position detecting means for determining a vehicle position using said road information;

recommended gear stage determine means for determining a recommended gear stage of an automatic transmission corresponding to a road situation determined by the vehicle position on the basis of the road information and a vehicle speed;

upper limit gear stage set means for setting an upper limit gear stage on the basis of the recommended gear stage; and shift means for changing a gear stage of the automatic transmission on the basis of the set upper limit gear stages, wherein said recommended gear stage determine means includes suppress means for suppressing the number of determinations of the recommended gear stage at a corner.

2. A vehicle control system, comprising:

a vehicle speed sensor that detects the speed of a vehicle;

recommended gear stage determine means for determining a recommended gear stage of an automatic transmission based on a vehicle speed and a corner;

upper limit gear stage set means for setting an upper limit gear stage on the basis of the recommended gear stage; and shift means for changing a gear stage of the automatic transmission on the basis of the set upper limit gear stage, wherein said recommended gear stage determine means includes suppress means for suppressing the number of determinations of the recommended gear stage at a corner, and said recommended gear stage determine means performs a hold control to keep the present gear stage when the vehicle speed exceeds a first set value, and a shift allowance control to determine a recommended gear stage to allow a downshift when the vehicle speed exceeds a second set value which is greater than the first value.

3. A vehicle control system, comprising:

a vehicle speed sensor that detects the speed of a vehicle;

recommended gear stage determine means for determining a recommended gear stage of an automatic transmission based on a vehicle speed and road situation;

upper limit gear stage set means for setting an upper limit gear stage on the basis of the recommended gear stage; and shift means for changing a gear stage of the automatic transmission on the basis of the set upper limit gear stage, wherein said recommended gear stage determine means includes suppress means for suppressing the number of determinations of the recommended gear stage at a corner, said recommended gear stage determine means performs a hold control to keep the present gear stage when the vehicle speed exceeds a first set value, and a shift allowance control to determine a recommended gear stage to allow a downshift when the vehicle speed exceeds a second set value, and the suppress means suppresses the number of determinations of the recommended gear stage by widening the area of the hold control.

4. A vehicle control system, comprising:

a vehicle speed sensor that detects the speed of a vehicle;

recommended rear stage determine means for determining a recommended gear stage of an automatic transmission based on a vehicle speed and road situation;

upper limit gear stage set means for setting an upper limit gear stage on the basis of the recommended gear stage; and shift means for changing a gear stage of the automatic transmission on the basis of the set upper limit gear stage, wherein said recommended gear stage determine means includes suppress means for suppressing the number of determinations of the recommended gear stage at a corner, and the suppress means suppresses the number of determinations of the recommended gear stage by widening the area of the shift control.

5. A vehicle control system, comprising:

a vehicle speed sensor that detects the speed of a vehicle;

recommended gear stage determine means for determining a recommended gear stage of an automatic transmission based on a vehicle speed and road situation;

upper limit gear stage set means for setting an upper limit gear stage on the basis of the recommended gear stage;

shift means for changing a gear stage of the automatic transmission on the basis of the set upper limit gear stager; and corner continuity decide means for deciding whether the corner continues, wherein said recommended gear stage determine means includes suppress means for suppressing the number of determinations of the recommended gear stage at a corner when the corner continues.

6. A recording medium including a plurality of programs, the plurality of programs stored in the recording medium comprising:

a program for determining a recommended gear stage of an automatic transmission based on a vehicle speed and a road situation including at least a corner;

a program for setting an upper limit gear stage on the basis of the recommended gear stage;

a program for changing a gear stage of the automatic transmission on the basis of the set upper limit gear stage; and a program for suppressing the number of determinations of the recommended gear stage at a corner.

7. A vehicle control system including a recording medium for storing programs and data, comprising:

a speed sensor that outputs vehicle speed;

a position sensor that outputs signals related to vehicle position;

a processing unit that uses the output vehicle speed, a position determined from the signals from the position sensor and programs and data from the recording medium to:

determine a recommended gear stage based on the vehicle speed, position and pending road conditions that include an upcoming corner;

sets an upper limit gear stage based on the recommended gear stage;

changes a gear stage on the basis of the set upper limit gear stage; and determines whether a length of the upcoming corner exceeds a predetermined value, and when so, suppresses the number of determinations of the recommended gear stage.

8. The vehicle control system according to claim 7, further performs a hold control to maintain the present gear stage when the vehicle speed is greater than a first value but less than a second value.

9. The vehicle control system according to claim 8, further recommended a down shift when the vehicle speed exceeds the second value.

10. The vehicle control system according to claim 8, adjusts a reference vehicle parameter to widen the hold control area thereby reducing the number of determinations.

11. The vehicle control system according to claim 9, adjusts a reference vehicle parameter to widen the area of shift allowance control thereby reducing the number of gear shifts.

12. The vehicle control system according to claim 1, wherein said recommended gear stage determine means includes suppress means for suppressing the number of determinations of the recommended gear stage at a corner.

* * * * *